United States Patent
Choi

(10) Patent No.: US 11,823,855 B2
(45) Date of Patent: Nov. 21, 2023

(54) RELAY CONTROL APPARATUS AND METHOD

(71) Applicant: LG ENERGY SOLUTION, LTD., Seoul (KR)

(72) Inventor: Jang-Hyeok Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 17/802,804

(22) PCT Filed: Nov. 11, 2021

(86) PCT No.: PCT/KR2021/016470
§ 371 (c)(1),
(2) Date: Aug. 26, 2022

(87) PCT Pub. No.: WO2022/103182
PCT Pub. Date: May 19, 2022

(65) Prior Publication Data
US 2023/0146895 A1    May 11, 2023

(30) Foreign Application Priority Data
Nov. 13, 2020  (KR) .......... 10-2020-0152316

(51) Int. Cl.
*H01H 47/00*    (2006.01)
*B60L 58/10*    (2019.01)
(Continued)

(52) U.S. Cl.
CPC .......... *H01H 47/001* (2013.01); *B60L 58/10* (2019.02); *H01H 47/04* (2013.01); *H01H 47/20* (2013.01); *H02J 7/0032* (2013.01)

(58) Field of Classification Search
CPC ...... H01H 47/001; H01H 47/04; H01H 47/20; B60L 58/10; H02J 7/0032
(Continued)

(56) References Cited

U.S. PATENT DOCUMENTS

2020/0088792 A1  3/2020  Han et al.
2020/0169208 A1* 5/2020  Koyama ................ B60L 3/04
(Continued)

FOREIGN PATENT DOCUMENTS

JP    9-230902 A    9/1997
JP    2008-206288 A    9/2008
(Continued)

OTHER PUBLICATIONS

International Search Report (PCT/ISA/210) issued in PCT/KR2021/016470, dated Feb. 25, 2022.

*Primary Examiner* — Yemane Mehari
(74) *Attorney, Agent, or Firm* — Birch, Stewart, Kolasch & Birch, LLP

(57) ABSTRACT

A relay control apparatus and method for retaining a relay in a closed state even though a system error occurs to reset the processor. Therefore, the relay control apparatus and method prevents an accident caused by the reset of the processor since the operation state of a plurality of relays is maintained even when the processor is reset. In addition, if the operation state of the processor is a reset state even after a predetermined time passes, the operation state of the plurality of relays is changed to a turn-off state, and system resources and energy are prevented from being wasted. In addition, when the operation state of the processor is recovered, the operation state of the plurality of relays may be controlled by the processor.

12 Claims, 7 Drawing Sheets

(51) Int. Cl.
  *H01H 47/04* (2006.01)
  *H01H 47/20* (2006.01)
  *H02J 7/00* (2006.01)

(58) Field of Classification Search
  USPC .......................................................... 361/160
  See application file for complete search history.

(56) References Cited

U.S. PATENT DOCUMENTS

| 2020/0273267 | A1  | 8/2020 | Takahashi |
| 2021/0011085 | A1  | 1/2021 | Lee |
| 2021/0086656 | A1* | 3/2021 | Cheon ..................... B60L 58/10 |

FOREIGN PATENT DOCUMENTS

| JP | 5598447 B2 | 10/2014 |
| JP | 2016-130967 A | 7/2016 |
| JP | 6183229 B2 | 8/2017 |
| JP | 2020-89066 A | 6/2020 |
| KR | 10-2015-0050810 A | 5/2015 |
| KR | 10-1926196 B1 | 12/2018 |
| KR | 10-2020-0031925 A | 3/2020 |
| KR | 10-2020-0036274 A | 4/2020 |
| KR | 10-2020-0092208 A | 8/2020 |
| WO | WO 2019/058607 A1 | 3/2019 |
| WO | WO2020/111899 A1 | 6/2020 |

* cited by examiner

RELAY CONTROL APPARATUS AND METHOD

TECHNICAL FIELD

The present application claims priority to Korean Patent Application No. 10-2020-0152316 filed on Nov. 13, 2020 in the Republic of Korea, the disclosures of which are incorporated herein by reference.

The present disclosure relates to a relay control apparatus and method, and more particularly, to a relay control apparatus and method capable of retaining the operation state of a plurality of relays even when a processor is reset due to a system error.

BACKGROUND ART

Recently, the demand for portable electronic products such as notebook computers, video cameras and portable telephones has increased sharply, and energy storage batteries, robots, satellites and the like have been developed in earnest. Accordingly, high-performance secondary batteries allowing repeated charging and discharging are being actively studied.

Accordingly, as technology development and demand for mobile devices, electric vehicles, hybrid electric vehicles, energy storage systems, uninterruptible power devices, and the like increase, the demand for secondary batteries as an energy source is rapidly increasing. In particular, secondary batteries used in electric vehicles or hybrid electric vehicles are high-output, high-capacity secondary batteries, and many studies are being conducted thereon.

In addition, along with the high demand for secondary batteries, peripheral parts or devices related to the secondary batteries are also being studied. That is, various parts and devices such as a cell assembly configured by connecting a plurality of secondary batteries into one module, a BMS (Battery Management System) for controlling the charge/discharge of the cell assembly and monitoring a state of each secondary battery, a battery pack configured by combining the cell assembly and the BMS into one pack, and a relay for connecting the cell assembly to a load such as a motor are being studied.

The relay for connecting the cell assembly and the load may be provided to a power system. In addition, the power system may be responsible for supplying a stable power between a battery and a load by selectively opening and closing at least one relay. When such a power system is provided in a vehicle, in relation to the safety of the power system, it is important that the relay is not opened due to a system error while the vehicle is driving but the relay is maintained in a closed state.

Therefore, there is a need in the art for a technology capable of effectively retaining a relay in a closed state despite a system error. These requirements increase the complexity of the circuit.

DISCLOSURE

Technical Problem

The present disclosure is designed to solve the problems of the related art, and therefore the present disclosure is directed to providing a relay control apparatus and method capable of retaining a relay in a closed state even though a system error occurs.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A relay control apparatus according to an aspect of the present disclosure may comprise: a processor configured to output a first control signal for controlling an operation state of a first relay and a second control signal for controlling an operation state of a second relay; a monitoring unit connected to the processor to monitor an operation state of the processor and configured to output a retain signal for maintaining the operation states of the first relay and the second relay according to the operation state of the processor; and a relay state determining unit configured to receive the first control signal and the second control signal from the processor, receive the retain signal from the monitoring unit, and output a first relay control signal for controlling the operation state of the first relay and a second relay control signal for controlling the operation state of the second relay based on the received first control signal, the second control signal and the retain signal.

The processor may be configured to further output a third control signal or a recovery signal for determining the first and second relay control signals output from the relay state determining unit according to the operation state of the processor to the relay state determining unit.

The relay state determining unit may be further configured to output a part of the first control signal, the second control signal and the retain signal as the first relay control signal and the second relay control signal, based on a signal level of the third control signal or the recovery signal received from the processor.

The processor may be configured to output the third control signal to the relay state determining unit, when the operation state of the processor is a reset state.

The processor may be configured to output the recovery signal to the relay state determining unit, when the operation state of the processor is a recovery state.

The recovery signal may be configured such that the signal level is output as a first signal level, and after a predetermined time passes, the signal level is transitioned to a second signal level.

The third control signal may be configured such that the signal level is transitioned from the first signal level to second signal level, when the recovery signal of the first signal level is output.

The third control signal may be preset such that the signal level is maintained as the first signal level, until the recovery signal of the first signal level is output.

When the operation state of the processor is the recovery state, the relay state determining unit may be configured to receive the recovery signal from the processor, output the first control signal as the first relay control signal, and output the second control signal as the second relay control signal.

When the operation state of the processor is the reset state, the relay state determining unit may be configured to receive the third control signal of the first signal level from the processor and output the retain signal as the first relay control signal and the second relay control signal.

When the operation state of the processor is the reset state, the monitoring unit may be configured to output the signal level of the retain signal as a second signal level for a predetermined time and output the signal level of the retain signal as the first signal level after the predetermined time passes.

When the signal level of the retain signal is the second signal level, the relay state determining unit may be configured to maintain the operation states of the first relay and the second relay.

When the signal level of the retain signal is the first signal level, the relay state determining unit may be configured to change the operation states of the first relay and the second relay.

A battery pack according to another aspect of the present disclosure may comprise the relay control apparatus according to an aspect of the present disclosure.

A vehicle according to still another aspect of the present disclosure may comprise the relay control apparatus according to an aspect of the present disclosure.

A relay control method according to still another aspect of the present disclosure comprises: a first signal output step of, by a processor, outputting a first control signal for controlling an operation state of a first relay and a second control signal for controlling an operation state of a second relay; a second signal output step of, by a monitoring unit, being connected to the processor to monitor an operation state of the processor and outputting a retain signal for maintaining the operation states of the first relay and the second relay according to the operation state of the processor; and a relay control signal output step, by a relay state determining unit, outputting a first relay control signal for controlling the operation state of the first relay and a second relay control signal for controlling the operation state of the second relay based on the first control signal, the second control signal and the retain signal.

A relay control method according to still another aspect of the present disclosure may further comprise, after the second signal output step, a third signal or recovery signal output step of, by the processor, outputting a third control signal or a recovery signal for determining the relay control signal output by the relay state determining unit according to the operation state of the processor.

The relay control signal output step may be a step of outputting a part of the first control signal, the second control signal and the retain signal as the first relay control signal and the second relay control signal, based on a signal level of the third control signal or the recovery signal.

Advantageous Effects

According to one aspect of the present disclosure, when the processor is reset, the operation state of a plurality of relays is maintained, and thus there is an advantage of preventing an accident caused by the reset of the processor.

In addition, according to one aspect of the present disclosure, if the operation state of the processor is a reset state even after a predetermined time passes, the operation state of the plurality of relays is changed to a turn-off state, and thus there is an advantage of preventing system resources and energy from being wasted.

In addition, according to one aspect of the present disclosure, when the operation state of the processor is recovered, there is an advantage in that the operation state of the plurality of relays may be controlled by the processor.

The effects of the present disclosure are not limited to the effects mentioned above, and other effects not mentioned will be clearly understood by those skilled in the art from the description of the claims.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

Furthermore, the term "processor" described in the specification refers to a unit that processes at least one function or operation, and may be implemented by hardware, software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 1:
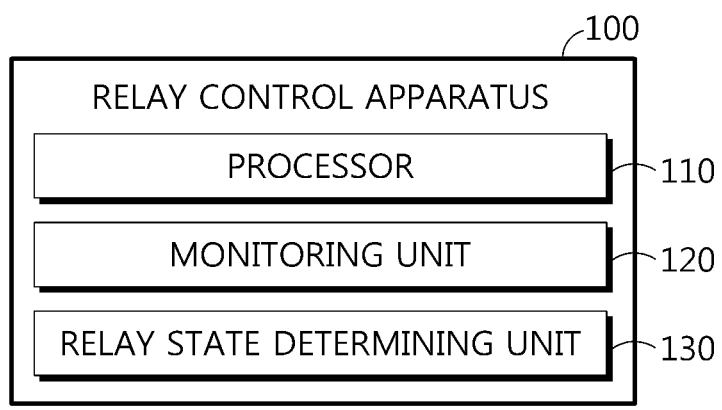
FIG. 1 is a diagram schematically showing a relay control apparatus according to an embodiment of the present disclosure.
Figure 2:
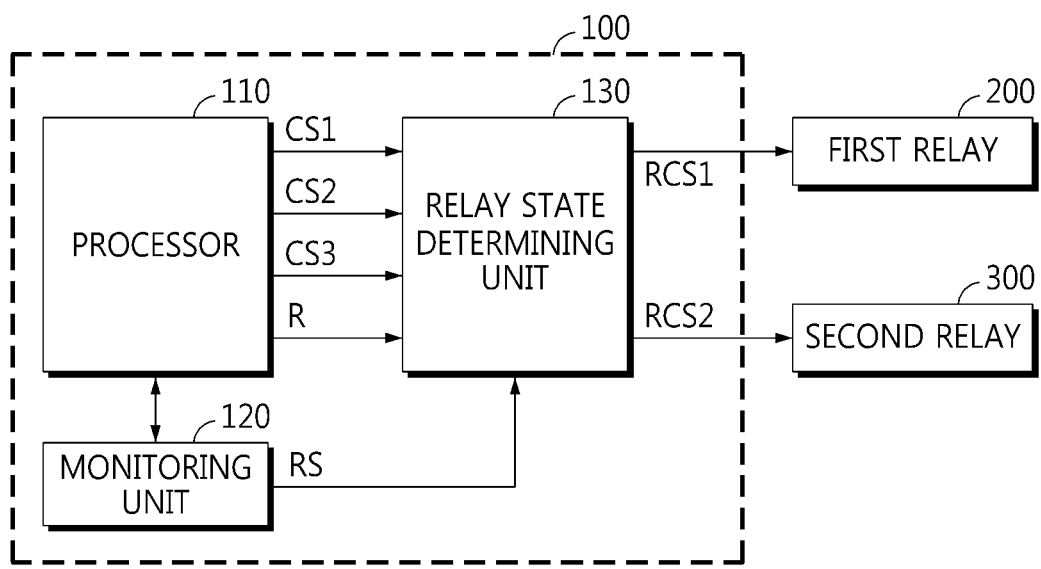
FIG. 2 is a diagram schematically showing an exemplary configuration of the relay control apparatus according to an embodiment of the present disclosure.

FIG. 1 is a diagram schematically showing a relay control apparatus 100 according to an embodiment of the present disclosure. FIG. 2 is a diagram schematically showing an exemplary configuration of the relay control apparatus 100 according to an embodiment of the present disclosure.

Referring to FIG. 1, the relay control apparatus 100 according to an embodiment of the present disclosure may include a processor 110, a monitoring unit 120 and a relay state determining unit 130.

The processor 110 may be configured to output a first control signal CS1 for controlling an operation state of a first relay 200 and a second control signal CS2 for controlling an operation state of a second relay 300.

For example, the first relay 200 and the second relay 300 may be relays for connecting a battery and a load. More specifically, the first relay 200 may be a relay at a high voltage as a high-side relay. Also, the second relay 300 may be a relay at a low voltage as a low-side relay.

In a normal state, the processor 110 may output the first control signal CS1 to control the operation state of the first relay 200 to a turn-on state or a turn-off state. In addition, in a normal state, the processor 110 may output the second control signal CS2 to control the operation state of the second relay 300 to a turn-on state or a turn-off state. Here, the operation state of each of the first relay 200 and the second relay 300 may be controlled according to a signal level of each of the first control signal CS1 and the second control signal CS2.

The monitoring unit 120 may be connected to the processor 110 and configured to monitor an operation state of the processor 110.

Specifically, the monitoring unit 120 may be communicatively connected to the processor 110. In addition, the monitoring unit 120 may monitor whether the operation state of the processor 110 is a normal state or a reset state. Here, the reset state means a state in which the operation of the processor 110 is restarted.

For example, in the embodiment of FIG. 2, the monitoring unit 120 may be connected to the processor 110 to monitor the operation state of the processor 110.

In addition, the monitoring unit 120 may be configured to output a retain signal RS for maintaining the operation states of the first relay 200 and the second relay 300 according to the operation state of the processor 110.

Specifically, the retain signal RS may be a signal for maintaining the operation states of the first relay 200 and the second relay 300 in a current state. For example, if the operation states of the first relay 200 and the second relay 300 are the turn-on state and the monitoring unit 120 outputs the retain signal RS, the operation states of the first relay 200 and the second relay 300 may be maintained in the turn-on state. Conversely, if the operation states of the first relay 200 and the second relay 300 are the turn-off state and the monitoring unit 120 outputs the retain signal RS, the operation states of the first relay 200 and the second relay 300 may be maintained in the turn-off state.

The relay state determining unit 130 may be configured to receive the first control signal CS1 and the second control signal CS2 from the processor 110.

For example, in the embodiment of FIG. 2, the relay state determining unit 130 may be electrically connected to the processor 110 to receive the first control signal CS1 and the second control signal CS2 from the processor 110.

In addition, the relay state determining unit 130 may be configured to receive the retain signal RS from the monitoring unit 120.

For example, in the embodiment of FIG. 2, the relay state determining unit 130 may be electrically connected to the monitoring unit 120 to receive the retain signal RS from the monitoring unit 120.

The relay state determining unit 130 may be configured to output a first relay control signal RCS1 for controlling the operation state of the first relay 200 and a second relay control signal RCS2 for controlling the operation state of the second relay 300 based on the received first control signal CS1, the second control signal CS2 and the retain signal RS.

Here, the first relay control signal RCS1 is a signal output to the first relay 200 to determine the operation state of the first relay 200. Similarly, the second relay control signal RCS2 is a signal output to the second relay 300 to determine the operation state of the second relay 300.

The relay state determining unit 130 may select the first control signal CS1 as the first relay control signal RCS1 and select the second control signal CS2 as the second relay control signal RCS2. Conversely, the relay state determining unit 130 may also select the retain signal RS as the first relay control signal RCS1 and the second relay control signal RCS2. The first relay control signal RCS1 and the second relay control signal RCS2 selected by the relay state determining unit 130 may be determined by a third control signal CS3 received from the processor 110.

Specifically, the processor 110 may be configured to further output the third control signal CS3 that determines the relay control signal output from the relay state determining unit 130 according to the operation state of the processor 110 or the recovery signal R.

Preferably, the processor 110 may be configured to output the third control signal CS3 to the relay state determining unit 130 when the operation state of the processor 110 is a reset state. Conversely, the processor 110 may be configured to output the recovery signal R to the relay state determining unit 130 when the operation state of the processor 110 is a recovery state. Here, the reset state refers to a state in which the processor 110 is rebooted, and the recovery state refers to a state in which the processor 110 is booted normally and recovers a normal state.

For example, in the embodiment of FIG. 2, if the operation state of the processor 110 becomes a reset state, the processor 110 may immediately output the third control signal CS3 to the relay state determining unit 130.

In addition, the relay state determining unit 130 may be configured to output a part of the first control signal CS1, the second control signal CS2 and the retain signal RS as the first relay control signal RCS1 and the second relay control signal RCS2, based on the signal level of the third control signal CS3 received from the processor 110.

Here, the signal level may be classified into a low level and a high level. The high level may mean a signal level greater than or equal to a predetermined reference level, and the low level may mean a signal level greater than or equal to 0 and less than the reference level.

Preferably, when the processor 110 is in the reset state, the signal level of the third control signal CS3 may be set to maintain a low level.

If the operation state of the processor 110 is a reset state, the relay state determining unit 130 may select the first relay control signal RCS1 and the second relay control signal RCS2 among the first control signal CS1, the second control signal CS2 and the retain signal RS according to whether the signal level of the third control signal CS3 is a high level or a low level.

As another example, in the embodiment of FIG. 2, when the operation state of the processor 110 is changed from the reset state to the recovery state, the processor 110 may immediately output the recovery signal R to the relay state determining unit 130.

When the recovery signal R is output from the processor 110, the signal level of the third control signal CS3 may be transitioned from a low level to a high level. In addition, when the operation state of the processor 110 is the recovery state, the relay state determining unit 130 may select the first control signal CS1 as the first relay control signal RCS1 and select the second control signal CS2 as the second relay control signal RCS2. That is, when the operation state becomes the recovery state, the processor 110 may recover the right of controlling the operation state of the first relay 200 and the second relay 300 by outputting the recovery signal R.

The relay control apparatus 100 according to an embodiment of the present disclosure may control the operation states of the first relay 200 and the second relay 300 to be maintained even when the processor 110 is unexpectedly reset. For example, while the relay control apparatus 100 is provided to a vehicle and the vehicle is running, the processor 110 may be unintentionally reset due to a system error. In this case, if the operation states of the first relay 200 and the second relay 300 are changed from the turn-on state to the turn-off state just because the operation state of the processor 110 is a reset state, there is a problem that an unexpected accident may occur. Accordingly, even if the processor 110 is reset due to a system error, the relay control apparatus 100 may maintain the operation states of the first relay 200 and the second relay 300 as they are, thereby preventing an unexpected accident in advance.

Also, when the operation state of the processor 110 is transitioned to the recovery state, the relay control apparatus 100 may allow the operation states of the first relay 200 and the second relay 300 to be normally controlled by the processor 110.

Meanwhile, the processor 110 provided to the relay control apparatus 100 may selectively include application-specific integrated circuit (ASIC), other chipsets, logic circuits, registers, communication modems, data processing devices, and the like known in the art to execute various control logic performed in the present disclosure. Also, when the control logic is implemented in software, the processor 110 may be implemented as a set of program modules. At this time, the program module may be stored in a memory and executed by the processor 110. The memory may be located inside or out of the processor 110 and may be connected to the processor 110 by various well-known means.

Preferably, the recovery signal R may be configured such that the signal level is output as a first signal level, and the signal level is transitioned to a second signal level after a predetermined time passes. In addition, the third control signal CS3 may be configured such that, when the recovery signal R of the first signal level is output, the signal level is transitioned from the first signal level to the second signal level. That is, the third control signal CS3 may be preset such that the signal level maintains the first signal level until the recovery signal R of the first signal level is output. Here, the first signal level may mean a low level. That is, the signal level may be classified into a low level that is the first signal level and a high level that is the second signal level.

For example, in the embodiment of FIG. 2, when the operation state of the processor 110 is the reset state, the signal level of the third control signal CS3 output from the processor 110 may be set to maintain the first signal level (low level).

Figure 3:
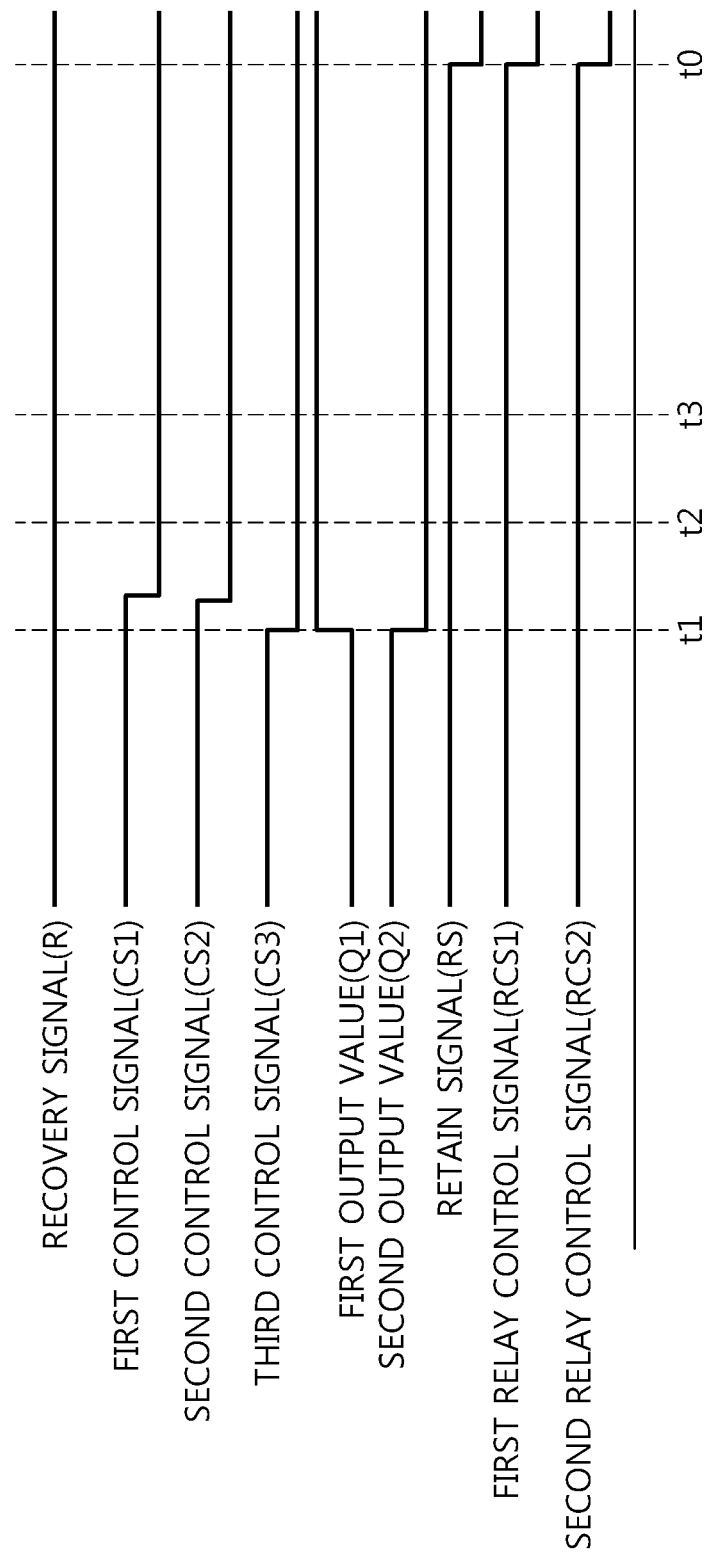
FIG. 3 is a diagram schematically showing an embodiment when a signal level of a third control signal according to an embodiment of the present disclosure is maintained in a first signal level.
Figure 4:
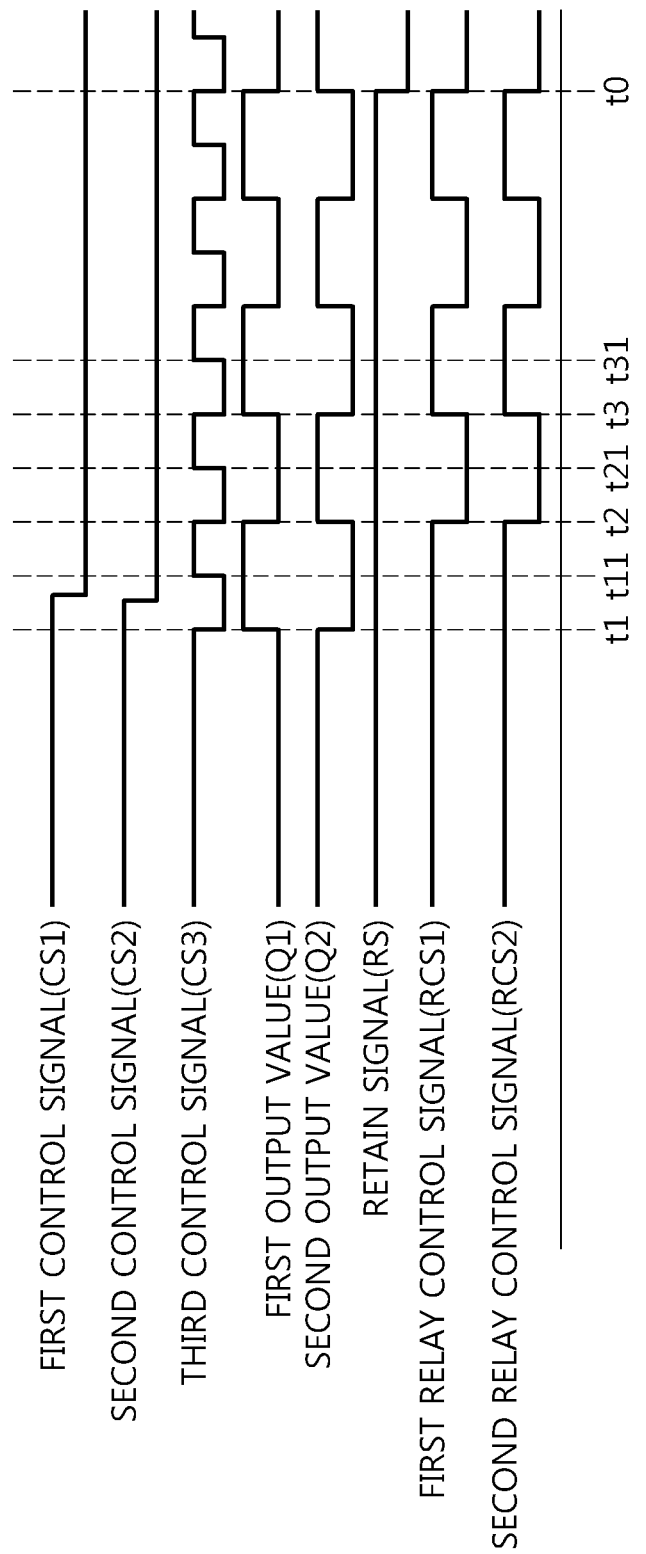
FIG. 4 is a diagram schematically showing a comparative example when the signal level of the third control signal according to an embodiment of the present disclosure is not maintained in the first signal level.

FIG. 3 is a diagram schematically showing an embodiment when the signal level of the third control signal CS3 is maintained in the first signal level. FIG. 4 is a diagram schematically showing a comparative example when the signal level of the third control signal CS3 is not maintained in the first signal level. Specifically, the embodiment of FIG. 3 and the comparative example of FIG. 4 are examples for a case in which the operation state of the processor 110 is a reset state and is not transitioned to a recovery state.

FIGS. 3 and 4 are diagrams showing the first control signal CS1, the second control signal CS2, the third control signal CS3, a first output value Q1, a second output value Q2, the retain signal RS, the first relay control signal RCS1 and the second relay control signal RCS2, which are output as time flows.

In FIGS. 3 and 4, the signal level or output value of each of the first control signal CS1, the second control signal CS2, the third control signal CS3, the first output value Q1, the second output value Q2, the retain signal RS, the first relay control signal RCS1 and the second relay control signal RCS2 may be described using the first signal level meaning a low level and the second signal level meaning a high level.

Also, in FIGS. 3 and 4, it is assumed that the processor 110 is firstly reset at a time point t1, is secondly reset at a time point t2, and is thirdly reset at a time point t3.

In the embodiment of FIG. 3, since the signal level of the third control signal CS3 is set to be maintained at the first signal level, even if the processor 110 is firstly reset, secondly reset and thirdly reset, the first relay control signal RCS1 and the second relay control signal RCS2 may be maintained constant. That is, the operation states of the first relay 200 and the second relay 300 may be maintained.

Meanwhile, in the comparative example of FIG. 4, the signal level of the third control signal CS3 is initially maintained at the first signal level, but may then be transitioned to the second signal level. For example, the signal level of the third control signal CS3 output at the time point t1 is the first signal level, but the signal level of the third control signal CS3 at the time point t11 may be transitioned to the second signal level. This may be because, in the comparative example of FIG. 4, the signal level of the third control signal CS3 is not set to be maintained at the first signal level.

More specifically, in the comparative example of FIG. 4, if the processor 110 is firstly reset, that is, at the time points t1 to t2, the first relay control signal RCS1 and the second relay control signal RCS2 may be constantly maintained. That is, the operation states of the first relay 200 and the second relay 300 may be maintained at the time point t1 to the time point t2.

Meanwhile, if the processor 110 is reset secondly or more, that is, at the time point t2, the third control signal CS3 having the first signal level is output, and even though the retain signal RS is output, the signal levels of the first relay control signal RCS1 and the second relay control signal RCS2 may be changed. This is because the first output value Q1 and the second output value Q2 of the flip-flop 131 are changed as the signal level of the third control signal CS3 is transitioned from the second signal level to the first signal level at the time point t2. In addition, at the time point t21, the signal level of the third control signal CS3 may be transitioned from the first signal level to the second signal level.

After that, if the processor 110 is reset thirdly at the time point t3, the signal level of the third control signal CS3 may be transitioned from the second signal level to the first signal level at the time point t3. In this case, the first output value Q1 and the second output value Q2 of the flip-flop 131 may be changed again. That is, even though the processor 110 is reset thirdly at the time point t3, since the first output value Q1 and the second output value Q2 of the flip-flop 131 are changed, the signal levels of the first relay control signal RCS1 and the second relay control signal RCS2 may also be changed. In addition, at the time point t31, the signal level of the third control signal CS3 may be transitioned from the first signal level to the second signal level.

Therefore, in the comparative example of FIG. 4, it is possible to prevent an unexpected accident by maintaining the operation states of the first relay 200 and the second relay 300 when the processor 110 is reset firstly, but when the processor 110 is reset secondly or more, there is a problem that the operation states of the first relay 200 and the second relay 300 cannot be maintained.

Meanwhile, as in the embodiment of FIG. 3, the relay control apparatus 100 according to an embodiment of the present disclosure has an advantage of maintaining the operation states of the first relay 200 and the second relay 300 even when the processor 110 is reset secondly or more.

When the operation state of the processor 110 is the recovery state, the relay state determining unit 130 may be configured to receive the recovery signal R from the processor 110, output the first control signal CS1 as the first relay control signal RCS1, and output the second control signal CS2 as the second relay control signal RCS2.

That is, if the third control signal CS3 of the first signal level is not received from the processor 110, the relay state determining unit 130 may be configured to output the first control signal CS1 as the first relay control signal RCS1 and output the second control signal CS2 as the second relay control signal RCS2.

Figure 5:
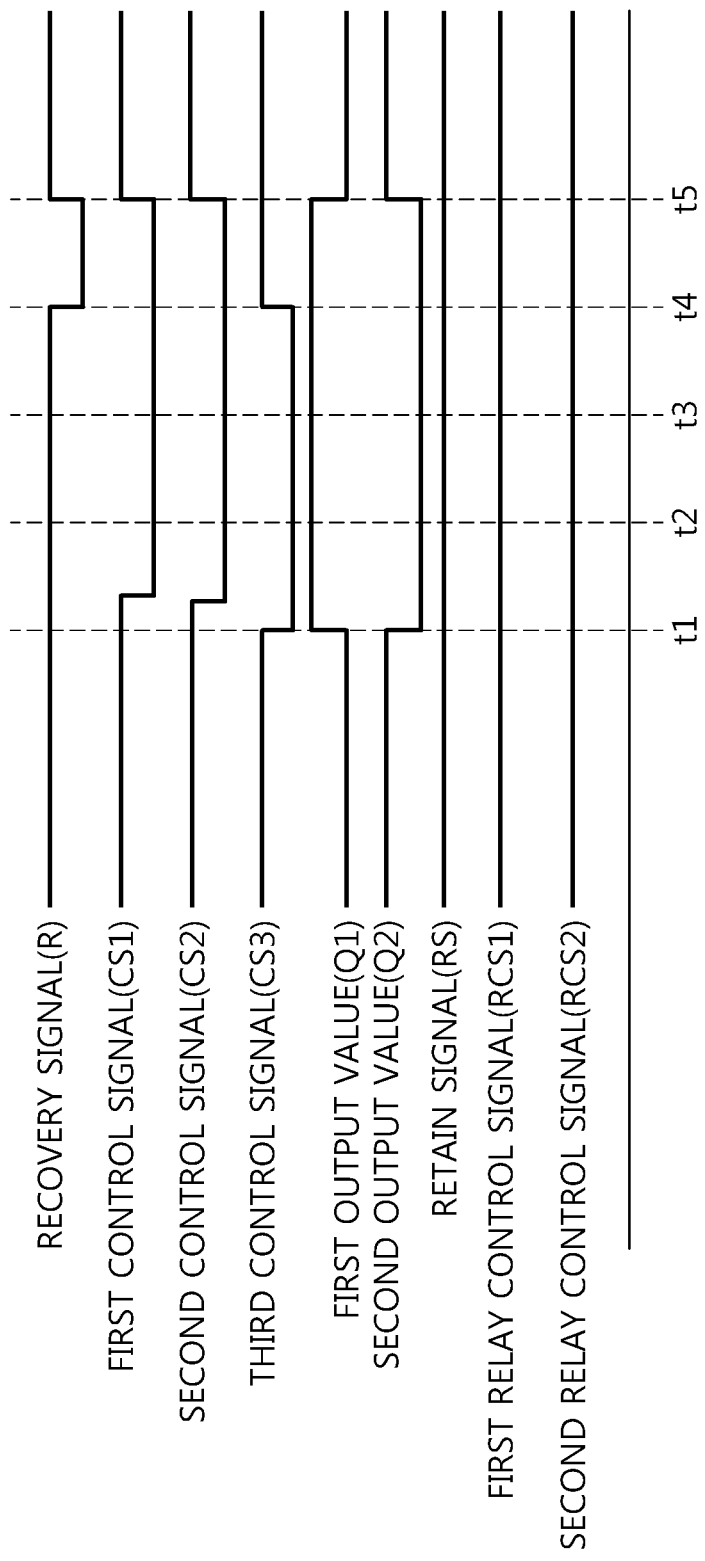
FIG. 5 is a diagram specifically showing an embodiment when the processor according to an embodiment of the present disclosure is in a recovery state.

FIG. 5 is a diagram specifically showing an embodiment when the processor according to an embodiment of the present disclosure is in a recovery state.

Specifically, the embodiment of FIG. 5 is an embodiment for a case in which the operation state of the processor 110 is transitioned to the recovery state at a time point t4 in the embodiment of FIG. 3.

In the embodiment of FIG. 5, when the operation state of the processor 110 is transitioned from the reset state to the recovery state at the time point t4, the processor 110 may output the recovery signal R immediately. In this case, the signal level of the output recovery signal R may be the first signal level. In addition, the processor 110 may output the recovery signal R of the first signal level and simultaneously transition the signal level of the third control signal CS3 from the first signal level to the second signal level.

At a time point t5 when a predetermined time passes from the time point t4, the signal level of the recovery signal R output from the processor 110 may be transitioned from the first signal level to the second signal level. In this case, the signal levels of the first control signal CS1 and the second control signal CS2 may be transitioned from the first signal level to the second signal level. Also, the first output value Q1 and the second output value Q2 of the flip-flop 131 may be changed.

Preferably, when the signal level of the recovery signal R output from the processor 110 to the relay state determining unit 130 is transitioned from the first signal level to the second signal level, the signal levels of the first output value Q1 and the second output value Q2 of the flip-flop 131 may be changed.

That is, the signal levels of the recovery signal R, the first control signal CS1, the second control signal CS2, the third control signal CS3, the first output value Q1 and the second output value Q2 may be the same as before the time point t1 from the time point t5.

Accordingly, from the time point t5, the operation states of the first relay 200 and the second relay 300 may be controlled by the processor 110 whose operation state is transitioned to the recovery state.

That is, the relay control apparatus 100 according to an embodiment of the present disclosure may maintain the operation states of the first relay 200 and the second relay 300 based on the third control signal CS3 output from the processor 110 when the processor 110 is reset one or more times. Thereafter, when the operation state of the processor 110 is transitioned to the recovery state, by returning the signal levels of the first control signal CS1, the second control signal CS2, the third control signal CS3, the first output value Q1 and the second output value Q2 to the original signal level based on the recovery signal R output from the processor 110, the operation states of the first relay 200 and the second relay 300 may be controlled by the processor 110.

Conversely, when the operation state of the processor 110 is the reset state, the relay state determining unit 130 may be configured to receive the third control signal CS3 of the first signal level from the processor 110, and output the retain signal RS to the first relay control signal RCS1 and the second relay control signal RCS2.

That is, if the third control signal CS3 of the first signal level is received from the processor 110, the relay state determining unit 130 may be configured to output the retain signal RS as the first relay control signal RCS1 and the second relay control signal RCS2.

Preferably, when the operation state of the processor 110 is a reset state, the monitoring unit 120 may output the retain signal RS to the relay state determining unit 130, and the processor 110 may output the third control signal CS3 to the relay state determining unit 130.

For example, referring to FIGS. 3 and 5, the signal level of the output retain signal RS may be the second signal level, and the signal level of the third control signal CS3 may be the first signal level.

That is, when the relay state determining unit 130 receives the third control signal CS3 from the processor 110, the operation state of the processor 110 may be a reset state. Conversely, when the relay state determining unit 130 does not receive the third control signal CS3 from the processor 110, the operation state of the processor 110 may be a normal state or a recovery state.

Therefore, if the third control signal CS3 is received, the relay state determining unit 130 may output the retain signal RS as the first relay control signal RCS1 and the second relay control signal RCS2 to maintain the operation states of the first relay 200 and the second relay 300. Conversely, if the third control signal CS3 is not received, the relay state determining unit 130 may output the first control signal CS1 as the first relay control signal RCS1 and output the second control signal CS2 as the second relay control signal RCS2. That is, the relay state determining unit 130 may control the operation state of each of the first relay 200 and the second relay 300 according to the first control signal CS1 and the second control signal CS2 received from the processor 110.

If the operation state of the processor 110 is the reset state, the monitoring unit 120 may be configured to output the signal level of the retain signal RS as the second signal level for a predetermined time. In addition, the monitoring unit 120 may be configured to output the signal level of the retain signal RS as the first signal level after the predetermined time. That is, when the operation state of the processor 110 is not transitioned to the recovery state for a predetermined time, the monitoring unit 120 may transition the signal level of the retain signal RS from the second signal level to the first signal level.

For example, if it is determined that the operation state of the processor 110 is the reset state, the monitoring unit 120 may output the retain signal RS having the second signal level (high level) for a predetermined time and may output the retain signal RS having first signal level (low level) after the predetermined time.

As described above, the first signal level may include 0. That is, the monitoring unit 120 may output the retain signal RS having the second signal level for a predetermined time and may not output the retain signal RS after the predetermined time.

The relay state determining unit 130 may be configured to maintain the operation states of the first relay 200 and the second relay 300, if the signal level of the retain signal RS is the second signal level. In addition, the relay state determining unit 130 may be configured to change the operation states of the first relay 200 and the second relay 300, if the signal level of the retain signal RS is the first signal level.

For example, in the embodiment of FIG. 3, it is assumed that the signal level of the retain signal RS is changed from the second signal level to the first signal level at the time point t0. In addition, it is assumed that the operation state of the processor 110 continues to be a reset state. In this case, since the operation state of the processor 110 is the reset state, the monitoring unit 120 may output the retain signal RS to the relay state determining unit 130, and the processor 110 may output the third control signal CS3 to the relay state determining unit 130. Here, the retain signal RS may have the second signal level from the time point t1 to the time point t0 and may have the first signal level after the time point t0. In addition, the third control signal CS3 may have the first signal level from the time point t1. Therefore, the relay state determining unit 130 may maintain the operation states of the first relay 200 and the second relay 300 as a turn-on state by outputting the retain signal RS having the second signal level as the first relay control signal RCS1 and the second relay control signal RCS2 from the time point t1 to the time point to. In addition, the relay state determining unit 130 may change the operation states of the first relay 200 and the second relay 300 to a turn-off state by outputting the retain signal RS having the first signal level as the first relay control signal RCS1 and the second relay control signal RCS2 from the time point t0.

That is, if the operation state of the processor 110 is the reset state, the monitoring unit 120 may output the retain signal RS having the second signal level for a predetermined time so that the operation states of the first relay 200 and the second relay 300 may maintain the turn-on state only for the predetermined time.

For example, even when the processor 110 is repeatedly reset, there is a problem that the operation states of the first relay 200 and the second relay 300 cannot be continuously maintained as the turn-on state. In this case, since the processor 110 is in a state of being reset, the signal levels of the first control signal CS1, the second control signal CS2 and the third control signal CS3 cannot be changed. Therefore, the monitoring unit 120 may change the operation states of the first relay 200 and the second relay 300 to the turn-off state by changing the signal level of the output retain signal RS. In addition, since the third control signal CS3 having the first signal level is continuously output when the processor 110 is in the reset state, the operation states of the first relay 200 and the second relay 300 may be maintained in the turn-off state. Accordingly, it is possible to prevent system resources and energy from being wasted in a situation in which the processor 110 is continuously reset.

Figure 6:
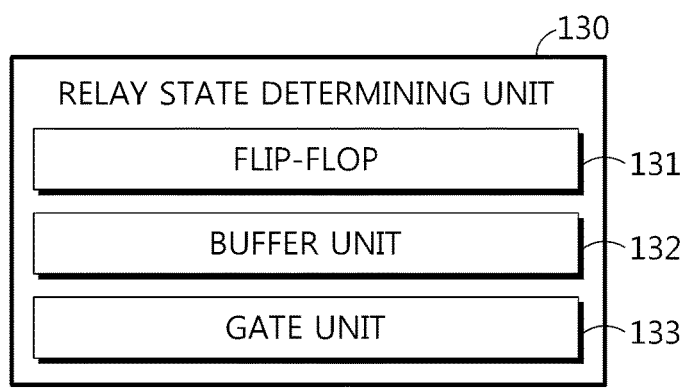
FIG. 6 is a diagram more specifically showing a relay state determining unit according to an embodiment of the present disclosure.
Figure 7:
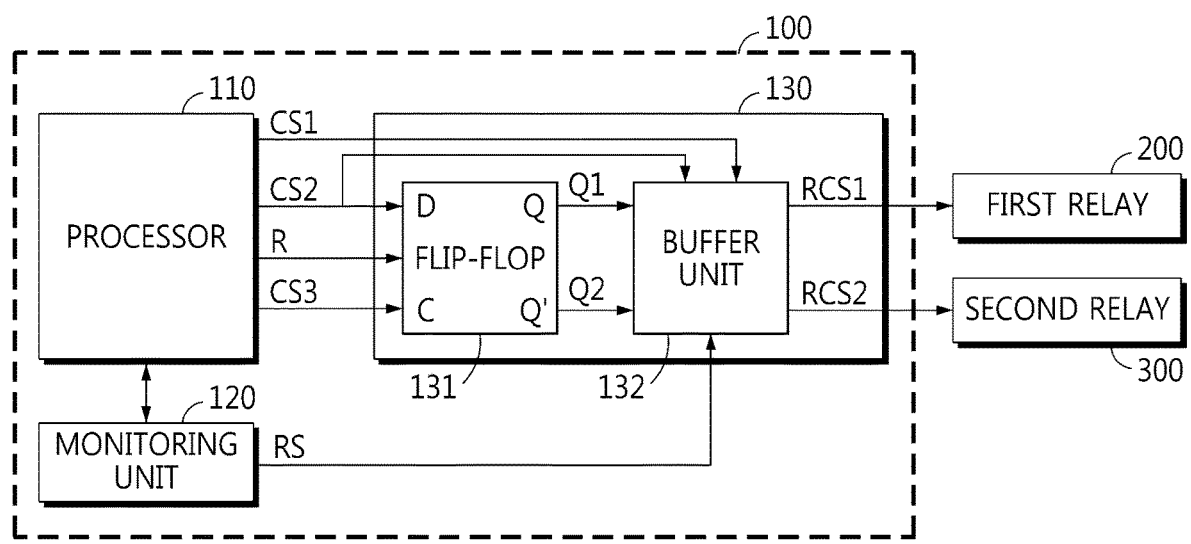
FIG. 7 is a diagram schematically showing an exemplary configuration of the relay state determining unit according to an embodiment of the present disclosure.

FIG. 6 is a diagram more specifically showing the relay state determining unit 130 according to an embodiment of the present disclosure. FIG. 7 is a diagram schematically showing an exemplary configuration of the relay state determining unit 130 according to an embodiment of the present disclosure.

Referring to FIGS. 6 and 7, the relay state determining unit 130 may include a flip-flop 131 and a buffer unit 132.

The flip-flop 131 is a logic circuit that may store and maintain 1 bit of information. For example, in the embodiment of FIG. 7, the flip-flop 131 may be a D flip-flop. In addition, the flip-flop 131 may also employ a RS flip-flop, a JK flip-flop or a T flip-flop. Hereinafter, for convenience of description, the flip-flop 131 will be described as the D flip-flop.

In the embodiment of FIG. 7, the flip-flop 131 may include a data terminal D, a clock terminal C, a first output terminal Q and a second output terminal Q'. The second control signal CS2 may be input to the data terminal D, the third control signal CS3 may be input to the clock terminal C, and the first output value Q1 may be output from the first output terminal Q and the second output value Q2 may be output from the second output terminal Q' according to the signal levels of the second control signal CS2 and the third control signal CS3. The first output value Q1 and the second output value Q2 may be input to the buffer unit 132. Here, the first output value Q1 and the second output value Q2 may have opposite signal levels. That is, if the signal level of the first output value Q1 is a first signal level, the signal level of the second output value Q2 is a second signal level.

The buffer unit 132 may receive the first control signal CS1 and the second control signal CS2 from the processor 110. In addition, the buffer unit 132 may receive the first output value Q1 and the second output value Q2 from the flip-flop 131 and may receive the retain signal RS from the monitoring unit 120. In addition, the buffer unit 132 may output the first relay control signal RCS1 for controlling the operation state of the first relay 200 to the first relay 200. In addition, the buffer unit 132 may output the second relay control signal RCS2 for controlling the operation state of the second relay 300 to the second relay 300.

Since the relay state determining unit 130 includes the flip-flop 131 and the buffer unit 132, even if the operation state of the processor 110 is a reset state, the operation states of the first relay 200 and the second relay 300 may be maintained according to the signal level of the third control signal CS3 and the signal level of the retain signal RS.

More specifically, the buffer unit 132 may include a plurality of buffers. For example, the buffer unit 132 may include a first buffer, a second buffer, a third buffer, and a fourth buffer.

The first buffer may be configured to receive the retain signal RS and the first output value Q1 and to determine whether or not to output the retain signal RS according to the signal level of the first output value Q1. For example, if the signal level of the first output value Q1 is the second signal level (high level), the retain signal RS may be output through the first buffer. Conversely, if the signal level of the first output value Q1 is the first signal level (low level), the retain signal RS may not be output through the first buffer.

The second buffer may be configured to receive the first control signal CS1 and the second output value Q2 and to determine whether or not to output the first control signal CS1 according to the signal level of the second output value Q2. For example, if the signal level of the second output value Q2 is the second signal level, the first control signal CS1 may be output through the second buffer. Conversely, if the signal level of the second output value Q2 is the first signal level, the first control signal CS1 may not be output through the second buffer.

In addition, the output line of the first buffer and the output line of the second buffer may be integrated with each other. That is, the first buffer and the second buffer respectively receive the first output value Q1 and the second output value Q2 having opposite signal levels. Accordingly, if the retain signal RS is output from the first buffer, the first control signal CS1 may not be output from the second buffer. For example, this is because, if the signal level of the first output value Q1 input to the first buffer is the second signal level (high level), the signal level of the second output value Q2 input to the second buffer is the first signal level (low level).

Therefore, according to the signal levels of the first output value Q1 and the second output value Q2, the first relay control signal RCS1 may be output as the first control signal CS1 or the retain signal RS.

In addition, if the processor 110 is in the reset state, the signal level of the third control signal CS3 input to the clock terminal C of the flip-flop 131 may always be set to the first signal level. In this case, the signal level of the first output value Q1 output from the flip-flop 131 may always be the second signal level, and the signal level of the second output value Q2 may always be the first signal level. Accordingly, if the processor 110 is in the reset state, since the retain signal RS is output from the first buffer as the first relay control signal RCS1, the operation state of the first relay 200 may be maintained.

Conversely, when the processor 110 is in the recovery state, the signal level of the third control signal CS3 input to the clock terminal C of the flip-flop 131 may be set to the second signal level. In this case, the signal level of the first output value Q1 output from the flip-flop 131 may be the first signal level, and the signal level of the second output value Q2 may be the second signal level. Accordingly, when the processor 110 is in the recovery state, the first control signal CS1 may be output from the first buffer as the first relay control signal RCS1. That is, the operation state of the first relay 200 may be controlled by the processor 110.

The third buffer may be configured to receive the second control signal CS2 and the second output value Q2 and to determine whether or not to output the second control signal CS2 according to the signal level of the second output value Q2. For example, if the signal level of the second output value Q2 is the second signal level, the second control signal CS2 may be output through the third buffer. Conversely, if the signal level of the second output value Q2 is the first signal level, the second control signal CS2 may not be output through the third buffer.

The fourth buffer may be configured to receive the retain signal RS and the first output value Q1 and to determine whether or not to output the retain signal RS according to the signal level of the first output value Q1. For example, if the signal level of the first output value Q1 is the second signal level (high level), the retain signal RS may be output through the fourth buffer. Conversely, if the signal level of the first output value Q1 is the first signal level (low level), the retain signal RS may not be output through the fourth buffer.

Similar to the first and second buffers, the output line of the third buffer and the output line of the fourth buffer may also be integrated. The third buffer and the fourth buffer respectively receive the second output value Q2 and the first output value Q1 having opposite signal levels. Therefore, if the second control signal CS2 is output from the third buffer, the retain signal RS is not output from the fourth buffer. Conversely, if the second control signal CS2 is not output from the third buffer, the retain signal RS is output from the fourth buffer. That is, the second relay control signal RCS2 is the second control signal CS2 output from the third buffer or the retain signal RS output from the fourth buffer.

As described above, if the processor 110 is in the reset state, the signal level of the first output value Q1 output from the flip-flop 131 based on the signal level of the third control signal CS3 may always be the second signal level. Therefore, if the processor 110 is in the reset state, since the retain signal RS is output from the fourth buffer as the second relay control signal RCS2, the operation state of the second relay 300 may be maintained.

Conversely, when the processor 110 is in the recovery state, the signal level of the first output value Q1 output from the flip-flop 131 may be the first signal level, and the signal level of the second output value Q2 may be the second signal level. Accordingly, when the processor 110 is in the recovery state, the second control signal CS2 may be output from the fourth buffer as the second relay control signal RCS2. That is, the operation state of the second relay 300 may be controlled by the processor 110.

Figure 8:
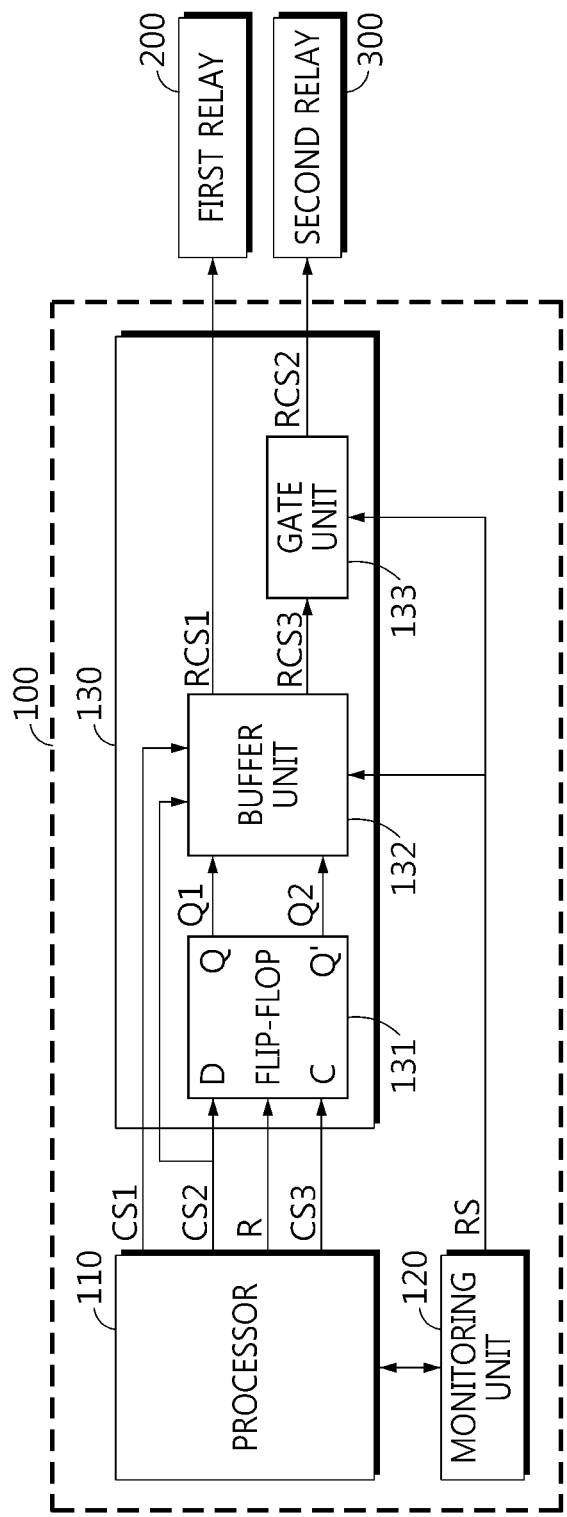
FIG. 8 is a diagram schematically showing another exemplary configuration of the relay state determining unit according to an embodiment of the present disclosure.

FIG. 8 is a diagram schematically showing another exemplary configuration of the relay state determining unit 130 according to an embodiment of the present disclosure.

Referring to FIGS. 6 and 8, the relay state determining unit 130 may further include a gate unit 133.

The gate unit 133 may be configured to be connected between at least one of the first relay 200 and the second relay 300 and the buffer unit 132.

In the embodiment of FIG. 8, the gate unit 133 may be connected between the buffer unit 132 and the second relay 300. The gate unit 133 may receive a third relay control signal RCS3 from the buffer unit 132 and receive the retain signal RS from the monitoring unit 120. In addition, the gate unit 133 may output the second relay control signal RCS2 to the second relay 300 based on the signal levels of the third relay control signal RCS3 and the retain signal RS.

As in the former embodiment, if the operation state of the processor 110 is the reset state, the retain signal RS may be output from the fourth buffer of the buffer unit 132. That is, the third relay control signal RCS3 may be the retain signal RS output from the fourth buffer. In this case, since the retain signal RS by the buffer unit 132 and the monitoring unit 120 is input to the gate unit 133, the second relay control signal RCS2 output from the gate unit 133 may be the retain signal RS. Therefore, since the retain signal RS is input to the second relay 300, the operation state of the second relay 300 may be maintained.

The relay control apparatus 100 according to the present disclosure may be applied to a BMS (Battery Management System). That is, the BMS according to the present disclosure may include the relay control apparatus 100 described above. In this configuration, at least some of components of the relay control apparatus 100 may be implemented by supplementing or adding functions of components included in a conventional BMS. For example, the processor 110, the monitoring unit 120 and the relay state determining unit 130 of the relay control apparatus 100 may be implemented as components of the BMS.

In addition, the relay control apparatus 100 according to the present disclosure may be provided to a battery pack 1. That is, the battery pack 1 according to the present disclosure may include the relay control apparatus 100 and at least one battery cell 10. In addition, the battery pack 1 may further include electrical equipment (a relay, a fuse, etc.), and a case.

Here, the battery cell means one independent cell that includes a negative electrode terminal and a positive electrode terminal and is physically separable. For example, one pouch-type lithium polymer cell may be regarded as the battery cell. Also, the battery pack may include one or more battery modules in which one or more battery cells are connected in series and/or in parallel.

In addition, the relay control apparatus 100 according to the present disclosure may be provided to a vehicle. Accordingly, the relay control apparatus 100 may control a relay so that the relay connecting a battery and a vehicle is not opened but kept closed even when the processor 110 is reset due to a system error while the vehicle is running.

Also, when the processor 110 is recovered, the relay control apparatus 100 may immediately grant the right to control the operation state of the first relay 200 and the second relay 300 to the processor 110.

Figure 9:
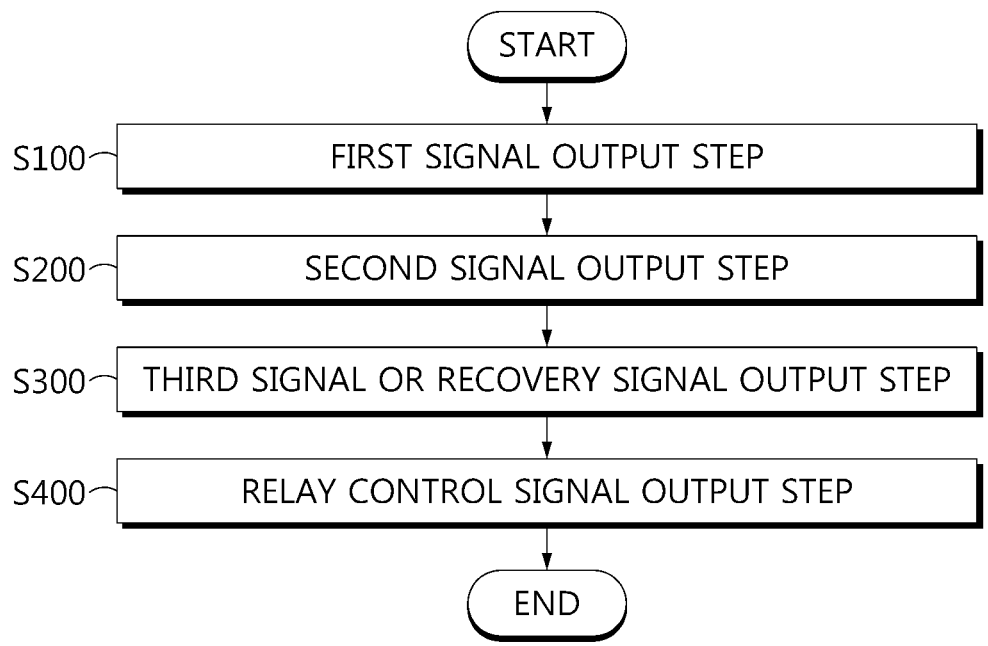
FIG. 9 is a diagram schematically showing a relay control method according to an embodiment of the present disclosure.

FIG. 9 is a diagram schematically showing a relay control method according to an embodiment of the present disclosure. Each step of the relay control method according to an embodiment of the present disclosure may be performed by the relay control apparatus 100.

Referring to FIG. 9, the relay control method may include a first signal output step (S100), a second signal output step (S200), a third signal or recovery signal output step (S300), and a relay control signal output step (S400).

The first signal output step (S100) is a step of outputting a first control signal CS1 for controlling the operation state of the first relay 200 and a second control signal CS2 for controlling the operation state of the second relay 300, and may be performed by the processor 110.

The second signal output step (S200) is a step of being connected to the processor 110 to monitor the operation state of the processor 110 and outputting a retain signal RS for maintaining the operation state of the first relay 200 and the second relay 300 according to the operation state of the processor 110, and may be performed by the monitoring unit 120.

The monitoring unit 120 may monitor the operation state of the processor 110, and if the operation state of the processor 110 becomes a reset state, the monitoring unit 120 may output the retain signal RS to the relay state determining unit 130.

The third signal or recovery signal output step (S300) may be performed after the second signal output step (S200). Specifically, the third signal or recovery signal output step (S300) is a step of further outputting a third control signal CS3 or a recovery signal R for determining the relay control signal output from the relay state determining unit 130 according to the operation state of the processor 110, and may be performed by the processor 110.

The processor 110 may output the third control signal CS3 to the relay state determining unit 130 as soon as the operation state becomes the reset state. Preferably, the signal level of the third control signal CS3 may be set to always maintain the first signal level (low level).

Also, the processor 110 may output the recovery signal R to the relay state determining unit 130 as soon as the operation state becomes the recovery state. Here, the signal level of the output recovery signal R may be the first signal level. In addition, the processor 110 may transition the signal level of the third control signal CS3 from the first signal level to the second signal level. Thereafter, when the signal level of the recovery signal R is transitioned from the first signal level to the second signal level, the signal levels of the first control signal CS1, the second control signal CS2, the first output value Q1, and the second output value Q2 may be recovered to the state before the processor 110 is reset.

The relay control signal output step (S400) is a step of outputting a first relay control signal RCS1 for controlling the operation state of the first relay 200 and a second relay control signal RCS2 for controlling the operation state of the second relay 300 based on the first control signal CS1, the second control signal CS2 and the retain signal RS, and may be performed by the relay state determining unit 130.

More specifically, the relay control signal output step (S400) may be a step of outputting a part of the first control signal CS1, the second control signal CS2 and the retain signal RS as the first relay control signal RCS1 and the second relay control signal RCS2, based on the signal level of the third control signal CS3 or the recovery signal R received from the processor 110.

For example, if the operation state of the processor 110 is a reset state, the signal level of the third control signal CS3 may be the first signal level. In this case, the retain signal RS may be output as the first relay control signal RCS1 and the second relay control signal RCS2. Therefore, the operation states of the first relay 200 and the second relay 300 may be maintained or changed according to the signal level of the retain signal RS.

Specifically, it is assumed that the processor 110 is reset when the operation states of the first relay 200 and the second relay 300 are the turn-on state. In this case, the signal level of the retain signal RS may be the second signal level. In addition, since the retain signal RS is input to the first relay 200 and the second relay 300, the operation states of the first relay 200 and the second relay 300 may be maintained in the turn-on state.

After that, if the operation state of the processor 110 is the reset state even after a predetermined time passes, the signal level of the retain signal RS may be transitioned to the first signal level. In this case, since the retain signal RS is input to the first relay 200 and the second relay 300, the operation states of the first relay 200 and the second relay 300 may be changed to the turn-off state.

Therefore, the relay control method according to an embodiment of the present disclosure has an advantage of preventing an accident caused by the reset of the processor 110 by maintaining the operation states of a plurality of relays when the processor 110 is reset. In addition, if the operation state of the processor 110 is a reset state even after that a predetermined time passes, the operation states of the plurality of relays are changed to a turn-off state, thereby giving an advantage of preventing system resources and energy from being wasted.

As another example, when the operation state of the processor 110 is transitioned from the reset state to the recovery state, the recovery signal R of the first signal level may be output, and the signal level of the third control signal CS3 may be transitioned from the first signal level to the second signal level. Thereafter, when the signal level of the recovery signal R is transitioned from the first signal level to the second signal level, the first control signal CS1 may be output as the first relay control signal RCS1, and the second control signal CS2 may be output as the second relay control signal RCS2. Accordingly, the operation states of the first relay 200 and the second relay 300 may be controlled by the processor 110.

Therefore, the relay control method according to an embodiment of the present disclosure has an advantage of stably controlling the operation states of the plurality of relays by allowing the processor 110 to recover the right of controlling the plurality of relays again when the operation state of the processor 110 is recovered.

The embodiments of the present disclosure described above may not be implemented only through an apparatus and method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

100: relay control apparatus
110: processor
120: monitoring unit
130: relay state determining unit
131: flip-flop
132: buffer unit
133: gate unit
200: first relay
300: second relay

What is claimed is:

1. A relay control apparatus, comprising:
a processor configured to output a first control signal for controlling an operation state of a first relay and a second control signal for controlling an operation state of a second relay;
a monitoring unit connected to the processor to monitor an operation state of the processor and configured to output a retain signal for maintaining the operation states of the first relay and the second relay according to the operation state of the processor; and
a relay state determining unit configured to receive the first control signal and the second control signal from the processor, receive the retain signal from the monitoring unit, and output a first relay control signal for controlling the operation state of the first relay and a second relay control signal for controlling the operation state of the second relay based on the received first control signal, the received second control signal and the received retain signal,
wherein the processor is configured to further output a third control signal or a recovery signal for determining the first and second relay control signals output from the relay state determining unit according to the operation state of the processor to the relay state determining unit, and
wherein the relay state determining unit is further configured to output a part of the first control signal, the second control signal and the retain signal as the first relay control signal and the second relay control signal, based on a signal level of the third control signal or the recovery signal received from the processor.

2. The relay control apparatus according to claim 1,
wherein the processor is configured to output the third control signal to the relay state determining unit, when the operation state of the processor is a reset state, and
wherein the processor is configured to output the recovery signal to the relay state determining unit, when the operation state of the processor is a recovery state.

3. The relay control apparatus according to claim 2,
wherein the recovery signal is configured such that the signal level is output as a first signal level, and after a predetermined time passes, the signal level is transitioned to a second signal level, and
wherein the third control signal is configured such that the signal level is transitioned from the first signal level to second signal level, when the recovery signal of the first signal level is output.

4. The relay control apparatus according to claim 3,
wherein the third control signal is preset such that the signal level is maintained as the first signal level, until the recovery signal of the first signal level is output.

5. The relay control apparatus according to claim 3,
wherein when the operation state of the processor is the recovery state, the relay state determining unit is configured to receive the recovery signal from the processor, output the first control signal as the first relay control signal, and output the second control signal as the second relay control signal.

6. The relay control apparatus according to claim 3,
wherein when the operation state of the processor is the reset state, the relay state determining unit is configured to receive the third control signal of the first signal level from the processor and output the retain signal as the first relay control signal and the second relay control signal.

7. The relay control apparatus according to claim 6,
wherein when the operation state of the processor is the reset state, the monitoring unit is configured to output the signal level of the retain signal as the second signal level for a predetermined time and output the signal level of the retain signal as the first signal level after the predetermined time passes.

8. The relay control apparatus according to claim 7, wherein when the signal level of the retain signal is the second signal level, the relay state determining unit is configured to maintain the operation states of the first relay and the second relay.

9. The relay control apparatus according to claim 7, wherein when the signal level of the retain signal is the first signal level, the relay state determining unit is configured to change the operation states of the first relay and the second relay.

10. A battery pack, comprising the relay control apparatus according to claim 1.

11. A vehicle, comprising the relay control apparatus according to claim 1.

12. A relay control method, comprising:
- a first signal output step of, by a processor, outputting a first control signal for controlling an operation state of a first relay and a second control signal for controlling an operation state of a second relay;
- a second signal output step of, by a monitoring unit, being connected to the processor to monitor an operation state of the processor and outputting a retain signal configured to maintain the operation states of the first relay and the second relay according to the operation state of the processor; and
- a relay control signal output step, by a relay state determining unit, outputting a first relay control signal for controlling the operation state of the first relay and a second relay control signal for controlling the operation state of the second relay based on the first control signal, the second control signal and the retain signal,
wherein after the second signal output step, the relay control method further comprises a third signal or recovery signal output step of, by the processor, outputting a third control signal or a recovery signal for determining the relay control signal output by the relay state determining unit according to the operation state of the processor, and
wherein the relay control signal output step is a step of outputting a part of the first control signal, the second control signal and the retain signal as the first relay control signal and the second relay control signal, based on a signal level of the third control signal or the recovery signal.

* * * * *